United States Patent
Russo et al.

(10) Patent No.: US 6,948,347 B2
(45) Date of Patent: Sep. 27, 2005

(54) GRAPHICAL ROLLED STEEL SHEET FLATNESS DISPLAY AND METHOD OF USING SAME

(75) Inventors: Thomas J. Russo, Kingsville, MD (US); Peter F.W. Schrof, Forest Hill, MD (US); Bruce B. Grube, New Tripoli, PA (US); Donald James Ronemus, Hellertown, PA (US); Stanley Petrilla, Laurel, MD (US)

(73) Assignee: ISG Technologies Inc., Richfield, OH (US)

( * ) Notice: Subject to any disclaimer, the term of this patent is extended or adjusted under 35 U.S.C. 154(b) by 98 days.

(21) Appl. No.: 10/350,353

(22) Filed: Jan. 24, 2003

(65) Prior Publication Data

US 2004/0144145 A1 Jul. 29, 2004

(51) Int. Cl.[7] .............................................. B21B 37/28
(52) U.S. Cl. .............................. 72/9.1; 72/7.4; 72/11.4; 72/205; 72/365.2; 700/154
(58) Field of Search .............................. 72/7.1, 7.4, 8.6, 72/8.7, 9.1, 11.4, 11.8, 12.3, 205, 365.2; 73/862.07; 700/28–31, 83, 152, 154; 702/43; 703/2; 345/589, 591

(56) References Cited

U.S. PATENT DOCUMENTS

| | | | |
|---|---|---|---|
| 3,499,306 A | 3/1970 | Pearson | |
| 3,979,935 A | 9/1976 | Edwards et al. | |
| 4,127,027 A | 11/1978 | Berger et al. | |
| 4,131,004 A | 12/1978 | Eibe | |
| 4,188,809 A | 2/1980 | Ishimoto et al. | |
| 4,262,511 A | 4/1981 | Boisvert et al. | |
| 4,289,005 A | 9/1981 | Cabaret et al. | |
| 4,478,062 A | 10/1984 | Huzyak | |
| 4,928,257 A * | 5/1990 | Yerkes et al. | 702/40 |
| 5,083,867 A * | 1/1992 | Burk | 356/606 |
| 5,193,066 A | 3/1993 | Konishi et al. | |
| 5,203,188 A * | 4/1993 | Osgood et al. | 72/9.4 |
| 5,212,791 A | 5/1993 | Damian et al. | |
| 5,471,307 A * | 11/1995 | Koliopoulos et al. | 356/613 |
| 5,537,878 A | 7/1996 | Sendzimir et al. | |
| 5,781,302 A | 7/1998 | Grow et al. | |
| 5,798,925 A | 8/1998 | Poling | |
| 5,808,891 A | 9/1998 | Lee et al. | |
| 5,815,394 A | 9/1998 | Adeli et al. | |
| 5,842,192 A | 11/1998 | Garcia et al. | |
| 5,855,009 A | 12/1998 | Garcia et al. | |
| 5,866,820 A * | 2/1999 | Camplin et al. | 73/643 |
| 6,009,360 A | 12/1999 | Knapp | |
| 6,232,617 B1 * | 5/2001 | Vanhee | 250/559.45 |
| 6,263,257 B1 | 7/2001 | Acmmer | |
| 6,295,513 B1 | 9/2001 | Thackston | |
| 6,430,461 B1 | 8/2002 | Andorfer et al. | |
| 6,668,626 B2 * | 12/2003 | Grefve et al. | 73/104 |
| 2001/0049634 A1 | 12/2001 | Stewart | |
| 2002/0014099 A1 | 2/2002 | Norikura | |
| 2002/0035450 A1 | 3/2002 | Thackston | |
| 2002/0062942 A1 | 5/2002 | Strezov et al. | |

* cited by examiner

*Primary Examiner*—Ed Tolan
(74) *Attorney, Agent, or Firm*—Liniak, Berenato & White, LLC (57) ABSTRACT

A method for measuring and displaying the flatness of a rolled steel sheet is disclosed that includes the steps of measuring tension in the sheet at a plurality of locations on the surface of the sheet and determining a plurality of tension ranges into which the sensed tension level can fall. A color is associated with each of the tension ranges, and a representation of the sheet is produced that is made up of a plurality of regions, each region having a color corresponding to tension range into which the tension sensed at the corresponding location on the surface of the sheet falls. A device for carrying out this method is also disclosed.

22 Claims, 7 Drawing Sheets

(2 of 7 Drawing Sheet(s) Filed in Color)

PLOTS COLOR SCALE
+10 IU TO -10 IU

GRAPHICAL ROLLED STEEL SHEET FLATNESS DISPLAY AND METHOD OF USING SAME

REFERENCE TO COMPUTER PROGRAM LISTING APPENDIX

The computer program listing appendix contained in the file "FlatnessDisplayListing.txt" on compact disc 1 of 1, which has been filed with the United States Patent and Trademark Office in duplicate, is hereby incorporated by reference. The file was created on Dec. 10, 2002, and is 17,363 bytes in size.

FIELD OF THE INVENTION

The present invention is directed toward a graphical flatness indicator for a sheet of rolled material and a method of using this device, and, more specifically, toward a device that receives signals indicative of tension levels in a rolled steel sheet and produces output signals that generate, on a display, in real time, a color representation of a surface of the rolled steel sheet, wherein different colors on the representation correspond to different sensed tension levels in the rolled steel sheet, and toward a method of using the device.

BACKGROUND OF THE INVENTION

Steel sheet may be processed by cold rolling in a rolling mill to increase its strength. This is done by passing the sheet between a pair of rollers spaced by a distance less than the thickness of the sheet. In practice, owing to bending or expansion of the rollers, the pressure applied to the sheet is not completely uniform in either the length or width direction. This lack of uniformity produces internal compression and tensile stresses in the sheet that vary along its length and/or across its width.

In general, a steel sheet that has a uniform tension distribution will lie flat on a horizontal table if it is unwound and set down with the tension removed. Steel sheet having a non-uniform tension distribution does not generally lie flat, but instead has wavy or buckled portions that correspond to the areas of the sheet rolled with the lowest tension. Thus, the flatness of a sheet may be determined by measuring its tension distribution. Examples of tension measuring devices that make use of this fact can be found, for example, in U.S. Pat. No. 5,537,878 to Sendzimir and U.S. Pat. No. 3,499,306 to Pearson, the disclosures of which are hereby incorporated by reference.

The data produced by such tension sensors may be analyzed by computer to detect tension distributions that are outside normal ranges. However, merely detecting whether tension levels are too high or too low does not give complete information regarding the flatness of the sheet. Prior art devices may allow a sheet to be generally characterized as either acceptable or unacceptable, but provide little useful information as to how the tension varies across the length and width of the sheet. If more details concerning the tension distribution were available, decisions could be made concerning which portions of the sheet might be acceptable for some uses. Moreover, if information concerning the flatness of the sheet were available in real time, an operator might quickly determine what was causing an out-of-flatness condition and take the appropriate steps to correct the problem.

It is therefore desirable to provide a method and apparatus for receiving tension signals from a plurality of sensors measuring tension in a rolled sheet, and providing an output that produces, on a display, in real time, a representation of the flatness of the sheet.

SUMMARY OF THE INVENTION

In a first aspect, the invention comprises a graphical flatness display for a rolled steel sheet that includes at least one sensor for measuring a property of a rolled steel sheet at a plurality of locations on the sheet and producing a property output signal corresponding to a magnitude of the sensed property at each of the plurality of locations. A processor is operatively connected to the sensor and receives the sensor property output signals. Property magnitude ranges and a color corresponding to each of the property magnitude ranges are stored in a memory connected to the processor, and a color display is operatively connected to the processor. The processor receives a property output signal, determines the property magnitude range indicated by the output signal, and plots a point in the color corresponding to the property magnitude range on the display. The plot is made at a point on the display related to the location on the rolled steel sheet at which the property was sensed.

Another aspect of the invention comprises a method of indicating the flatness of a rolled steel sheet that involves measuring tension at a plurality of points across a first segment of the sheet and generating an output signal related to the tension sensed at each of the plurality of points. Then a representation of the first segment of the rolled steel sheet is displayed that includes regions corresponding to each of the plurality of points. A color at each region is related to the tension measured at the corresponding one of the plurality of points on the sheet.

Another aspect of the invention comprises a device for depicting the flatness of a rolled steel sheet in real time. The device includes a processor operatively connected to a sensing device that measures tension at a number of points on a rolled steel sheet and produces tension output signals related to sensed tensions. Numeric values based on the tension output signals are stored in a database, while colors corresponding to ranges of the numeric value are stored in a memory. The processor produces signals on a real-time basis to create a color image of the rolled steel sheet on a display with regions on the display corresponding to points on the rolled steel sheet, wherein the colors of the regions on the display are related to the tension level sensed at the corresponding points on the rolled steel sheet.

Another aspect of the invention is a device for monitoring the performance of a steel rolling mill that includes a plurality of sensors positioned to sense tension at selected points along the width of a rolled steel sheet being processed in the rolling mill. Each of the sensors produces an output signal proportional to the sensed tension. A processor is operatively connected to the tension sensors for receiving the sensor output signals, while a memory is operatively connected to the processor. The memory stores tension ranges and a color corresponding to each of the tension ranges. A color display is operatively connected to the processor. The processor produces a representation of the surface of each sheet of rolled steel being processed in the rolling mill on the display. The representation comprises a plurality of regions corresponding to selected points on the surface of the sheet with the color of each region corresponding to the tension range into which the sensed tension at the corresponding selected point falls. The representations of the surfaces of each sheet emerging from the rolling mill also includes a centerline, and the centerlines of adjacent sheets of rolled steel are aligned.

Another aspect of the invention is a device for displaying tension levels in a steel sheet that includes a processor operatively connected to a plurality of tension sensors for measuring tension at a plurality of locations spaced across the width of the sheet and producing an output signal corresponding to the sensed tension. A memory is operatively connected to the processor and stores tension ranges and a color corresponding to each of the tension ranges. A color display is operatively connected to the processor. The processor produces processor output signals for generating a color image on a color display, the image comprising regions corresponding to the plurality of locations, the color of each of the regions corresponding to the range into which the sensed tension falls.

An additional aspect of the invention comprises a method of measuring the flatness of a sheet of rolled steel that includes the steps of measuring the tension at a plurality of measurement points on the surface of a sheet of rolled steel, determining a plurality of tension ranges into which the sensed tension level can fall, associating a color with each of the determined tension ranges, and displaying a representation of the sheet of rolled steel. The representation comprises a plurality of regions corresponding to the plurality of measurement points and the color of each region is the color associated with the tension range into which the measured tension for each measurement point corresponding to each display point falls.

Another aspect of the invention comprises a real time flatness display that includes a processor connectable to a sensing device for measuring flatness at a number of points on a rolled steel sheet and producing an output signal corresponding to sensed flatness. A memory is operatively connected to the processor and stores color information for each sensed flatness. The output signal produces on a display a two-dimensional image of the sheet of rolled steel comprising a plurality of regions each corresponding to one of the plurality of points on the sheet of rolled steel. The color of each region is related to the sensed flatness at the corresponding point on the rolled steel sheet.

Still another aspect of the invention comprises a display having first and second display fields where the first display field displays a colored representation of a planar surface of a rolled sheet of steel with different colors on the colored representation representing different tension levels in the at least one rolled sheet of steel. The second display field comprises a colored representation of average tension levels along a portion of the rolled steel sheet.

Another aspect of the invention comprises a method of indicating the flatness of a first rolled sheet of steel $rs_1$ comprising the following steps:

a) providing a first rolled sheet of steel $rs_1$ having a plurality of width segments $w_1 \ldots w_m$ along a length of the first sheet of rolled steel $rs_1$;

b) providing a sensing device having a plurality of sensors $d_1 \ldots d_n$;

c) measuring a tension at a number of points $x_1 \ldots x_n$ across each width segment $w_1 \ldots w_m$ of the first sheet of steel $rs_1$;

d) generating output signals having a value $s_1 \ldots s_n$ related to the tension sensed at each point $x_1 \ldots x_n$ for each width segment $w_1 \ldots w_m$;

e) for each width segment $w_1 \ldots w_m$ storing the values $s_1 \ldots s_n$ in a row $r_1 \ldots r_m$ of a table $t_1$ wherein each column of the table comprises signals from one of the sensors $d_1 \ldots d_n$;

f) associating a color with each of the output signals $s_1 \ldots s_n$ based on the level of tension represented by the output signal; and g) for each width $w_1 \ldots w_n$ plotting points $p_1 \ldots p_n$ on a display corresponding to points $x_1 \ldots x_n$ on the width of the steel $rs_1$ wherein the color of each point $p_1 \ldots p_n$ is based on the level of tension represented by the output signals $s_1 \ldots s_n$.

BRIEF DESCRIPTION OF THE DRAWINGS

The application file contains two drawings, FIGS. 5 and 6. executed in color. Copies of this patent application publication with color drawings will be provided by the Office upon request and payment of the necessary fee. The invention will be better understood after a reading of the detailed description of the invention provided below together with the following drawings.

DETAILED DESCRIPTION OF THE INVENTION

Figure 1:
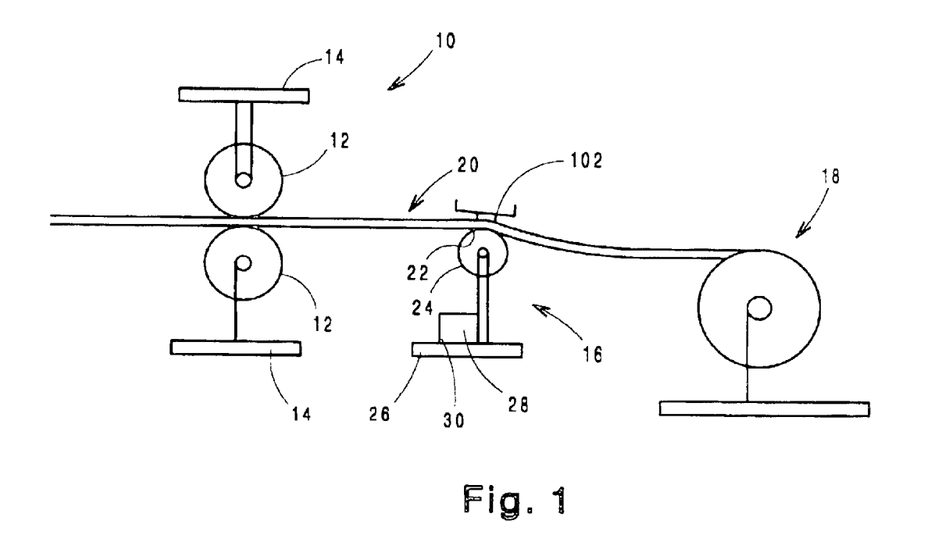
FIG. 1 is a schematic side elevational view of a cold rolling mill and a rolled steel sheet traveling over a tension sensor to a take-up roll.

Referring now to the drawings, wherein the showings are for purposes of illustrating a preferred embodiment of the invention only, and not for the purpose of limiting same, FIG. 1 shows a cold rolling mill 10 comprising a pair of rollers 12 supported on a frame 14, a tension sensing device 16, a take-up roll 18 and a steel sheet 20. Steel sheet 20 passes between the rollers 12 to strengthen the steel and is wound onto take-up roll 18 under tension. The tension in rolled steel sheet 20 holds the rolled steel sheet 20 against tension sensing device 16, thereby allowing the internal tension at the portion of the rolled steel sheet 20 in contact with tension sensing device 16 to be measured. It should be noted that, while the invention herein is described in connection with a cold rolled steel sheet, it could also be used to measure tension in a hot-rolled steel sheet or in a sheet of another material.

Figure 2:
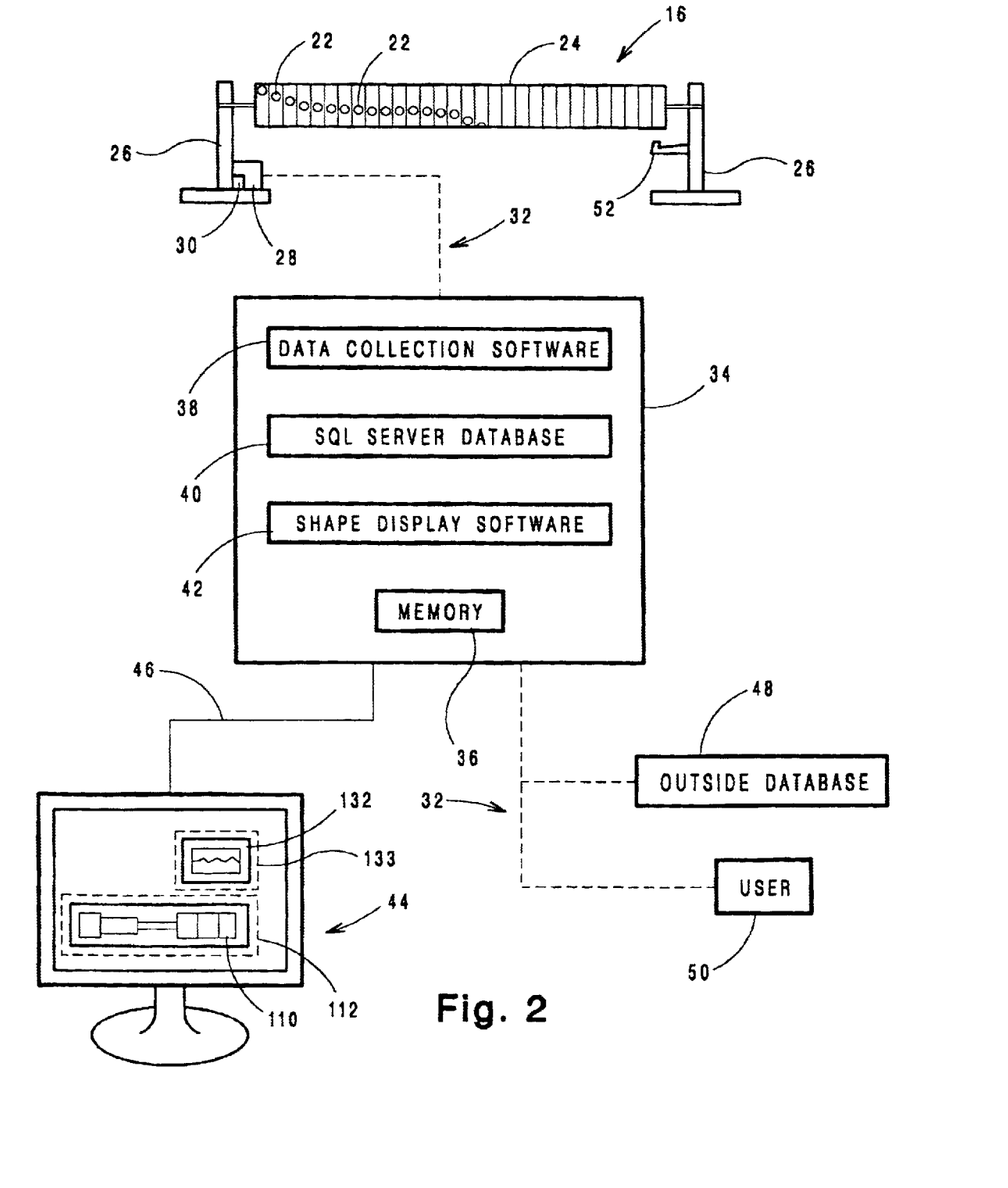
FIG. 2 is a schematic representation of the system of the present invention including the tension sensor of FIG. 1, a central processor and a display.

As best shown in FIG. 2, tension sensing device 16 comprises a plurality of tension sensors 22 positioned along a rotatable drum 24 supported for rotation by supports 26. Such tension sensing devices are known in the art. The number and exact arrangement of sensors on the drum can be varied as desired for a particular application. The preferred tension sensing device 16 described herein has fifty-four tension sensors 22.

Each tension sensor 22 generates a signal indicative of the load against the sensor 22 when the sensor 22 engages sheet 20. The sensors 22 may, for example, include a piezoelectric element that generates a signal proportional to applied load. Because drum 24 rotates, each of the sensors 22 will be in contact with rolled steel sheet 20 for part of a rotation only, and will thus periodically generate a signal each time it comes into contact with rolled steel sheet 20. The sensors 22 are preferably arranged in a spiral around the circumference of the drum 24, so that fewer than all sensors 22 are in contact with the rolled steel sheet 20 at any one time. Each sensor 22 will contact rolled steel sheet 20 once for each rotation completed by drum 24.

The tension sensors 22 are operably connected to a local processor 28 having a memory 30. Processor 26 is connected to a network 32, such as a LAN, WAN or the Internet, so that data concerning the sensed tension can be remotely retrieved. Preferably, tension data is sent over network 32 using UDP (user datagram protocol), a transmission protocol that offers a minimal transport service without the cumbersome error checking and other features of protocols like TCP.

A central processor 34 is also connected to network 32 and includes a memory 36. Various software runs on central processor 34 including data collection software 38, a database 40, preferably a SQL Server™ database, and shape display software 42. The operation of this software will be described herein. Central processor 34 is operably connected to a display 44, either by line 46 shown in FIG. 2 or over network 32, and to a secondary database 48 and various users 50 over network 32.

The collection of tension data is well known from the prior art. However, prior art methods and devices were generally unable to extract useful information from the data in a timely and informative way. For example, it would be useful to learn that one of the rollers in a rolling mill had developed a defect as soon the effects of the defect began to become apparent in the sheet of material being rolled, instead of hours later when the defect has degraded the quality of many rolls of steel sheet and potentially rendered them unusable.

Figure 3:
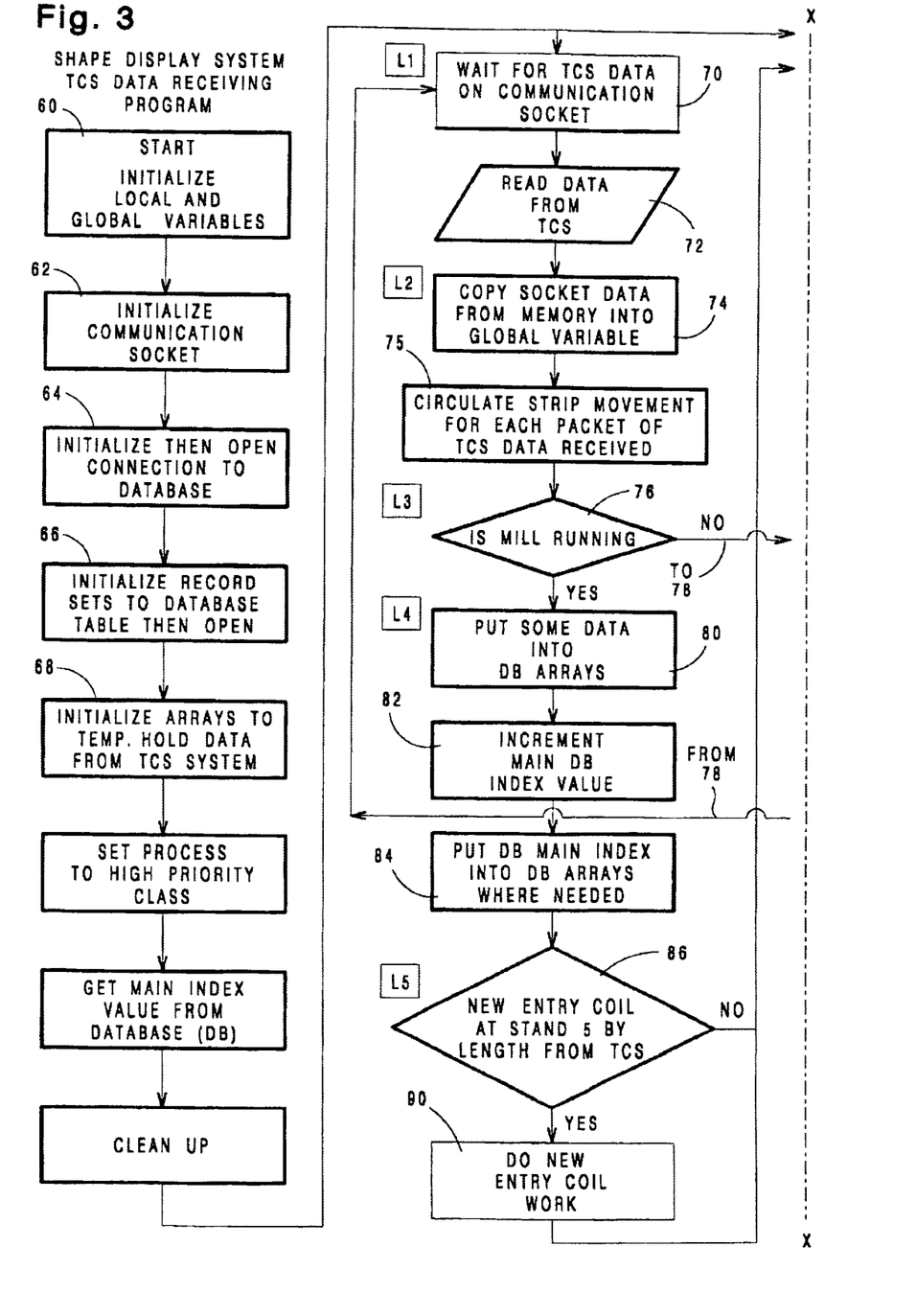
FIG. 3 is a flow chart showing how data is gathered by the central processor of the present system.
Figure 3A:
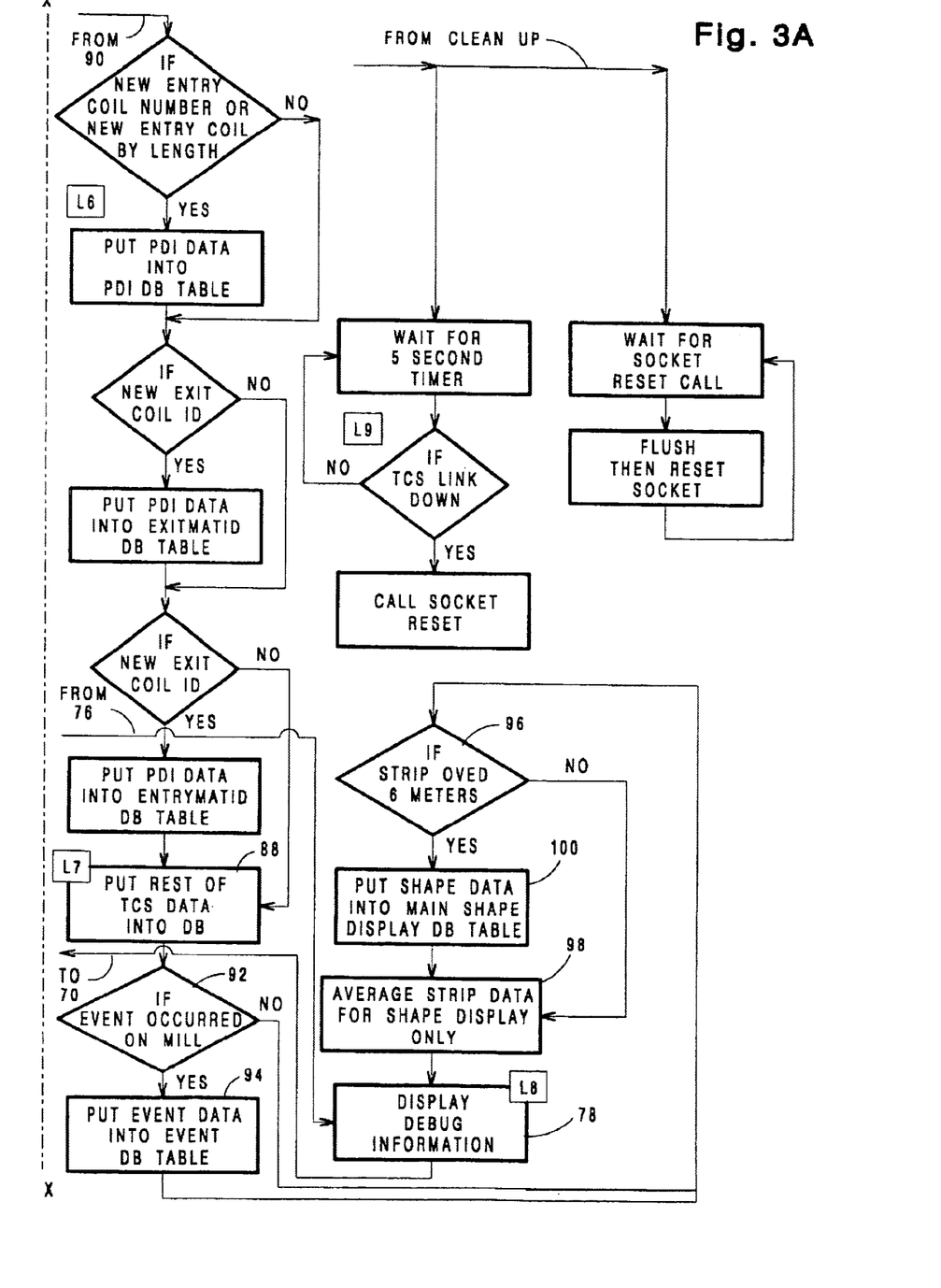

The collection of data by data collection software 38 will be explained with reference to the flow chart of FIG. 3. References L1–L9 in the flowchart refer to listings 1–9 in the code provided in the Appendix to this application to indicate which listing is responsible for which function. In a startup step 60, central processor 34 initializes local and global variables, and at step 62 initializes a communications socket to prepare to receive information over network 32. At step 64 a connection to SQL Server database 40 is opened, and record sets are initialized at step 66. At step 68, arrays are initialized to temporarily hold data received from tension sensing device 16. At step 70, central processor 34 waits for data to arrive over network 32, and this data is read at step 72. Socket data is copied from memory 36 into a global variable at step 74, and the distance that strip 20 has moved for each packet of data received from local processor 28 is calculated at step 75. For example, if drum 24 includes fifty-four sensors 22 distributed evenly about a six foot circumference, and local processor 28 sends data at 250 ms intervals, the receipt of 27 tension readings from local processor 28 would indicate that drum 24 had completed one half of a revolution and that strip 20 had moved three feet in that quarter-second period. There is little if any slippage between strip 20 and drum 24, and drum rotation thus provides a good indication of strip movement. A determination is made at step 76 whether mill 10 is running. If mill 10 is not running, a debugging operation is carried out at step 78. If mill 10 is running, data is entered into arrays in the database 40 at step 80, the main database index value is incremented at step 82 and the database main index is put into database arrays where needed at a step 84.

At step 86, a check is made to determine whether a new roll has been started. Steel sheet 20 and other sheets processed by mill 10 are joined together, such a by welding, to produce a continuous sheet with the end of one sheet pulling the beginning of a subsequent sheet through mill 10. Sensors, which may be optical sensors 52 shown in FIG. 2, for example, detect the presence of a weld and send a signal to central processor 34 to indicate that a sheet end has been detected. If a new roll is not detected at step 86, additional data from local processor 28 is placed into database 40 at a step 88. If a new sheet is detected at step 86, new coil entry work is done at step 90 and product data information (PDI) data is loaded into database 40 and associated with tension data from the new sheet. This PDI data is stored in a secondary database 48 and includes detailed information on the sheet being rolled. This information includes, for example, tolerance information for a given sheet and the degree of flatness required for that sheet.

At step 92 a determination is made as to whether an event has occurred in the mill, and if an event has occurred, data concerning the event is stored in database 40 at step 94. If no event has occurred, a determination is made at step 96 as to whether the sheet has moved a given distance, such as six meters. This determination is made from the calculation performed at step 75. If the sheet 20 has not moved the given distance, sheet data is averaged at step 98. If strip 20 has moved the given distance, shape data is placed into a main shape display table in step 100 before step 98 is carried out. From step 98, central processor 40 returns to step 70 and waits for data to arrive over network 32.

By following the above steps, database tables are created that include tension data from fifty-four points across the width of strip 20, this tension data being related to the tension in a short segment 102 of strip 20 equal to the circumference of drum 24, and these tension levels are stored in a row of a database table. Each time drum 24 rotates, fifty four additional data points are generated and stored in the table. Each column in the table will correspond to the tension levels sensed by one of the sensors 22 on drum 24. Thus the first column of the table will represent tension levels sensed at six foot intervals along a first longitudinal band 104 of strip 20 and the second column of the table will represent tension levels sensed at six-foot intervals along a second longitudinal band 106 of strip 20. The points at which tension is sensed along each band will be slightly offset given the circumferential offset of adjacent sensors 22 on drum 24.

The output signals from tension sensors 22 may be in any form, but are preferably converted to "I-units," a measure of flatness that uses positive and negative numbers to express the amount and direction of flatness deviations. I-units are explained in detail in ASTM standard A 568/A 568M which is hereby incorporated by reference.

Table 1 below is populated with arbitrary data to illustrate the operation of the present invention. The values in the table are in I-units.

TABLE 1

TENSION LEVELS

| | Sensor # | | | | | |
|---|---|---|---|---|---|---|
| | 0 | 1 | 2 | 3 | n − 1 | n |
| Width 1 | 1.2 | −4.5 | −6.1 | 5.6 | 3.1 | −0.6 |
| Width 2 | 1.5 | −5.0 | −7.2 | 6.1 | 4.0 | 1.1 |
| Width 3 | 1.1 | −4.7 | −6.8 | 5.9 | 4.1 | 1.0 |
| Width 4 | 1.1 | −4.5 | −6.1 | 6.0 | 3.1 | −0.2 |
| Width 5 | 2.1 | −3.8 | −5.9 | 6.3 | 3.9 | −0.5 |
| ... | | | | | | |

TABLE 1-continued

TENSION LEVELS

| | Sensor # | | | | | |
|---|---|---|---|---|---|---|
| | 0 | 1 | 2 | 3 | n − 1 | n |
| Width m − 1 | 1.3 | −4.4 | −6.2 | 6.4 | 3.2 | −0.3 |
| Width m | 2.2 | −3.7 | −5.8 | 6.2 | 3.8 | −0.4 |

I-unit ranges are defined as follow in central processor 34: −10 to −8, −7.99 to −6, −5.99 to −4, −3.99 to −2, −1.99 to −1, −0.99 to 0, 0 to 0.99, 1–1.99, 2–3.99, 4–5.99, 6–7.99 and 8–10. A color is assigned to each of these ranges. A preferred example of such a color assignment appears below. While other color schemes could be used, the below color assignment provides certain benefits that make it desirable. Specifically, under the below assignment, tension levels plotted in green colors are at acceptable levels. Orange and red are indicative of tension levels that require immediate attention, and blue regions indicate problems that require less immediate attention. This use of red to identify serious conditions is consistent with most user's associate of red with a warning or alert.

TABLE 2

COLORS ASSIGNED TO TENSION LEVEL RANGES

| Tension level | Color |
|---|---|
| −10 to −8 | Dark Blue |
| −7.99 to −6 | Blue |
| −5.99 to −4 | Light Blue |
| −3.99 to −2 | Aqua |
| −1.99 to −1 | Green-Blue |
| −0.99 to 0 | Green |
| 0 to 0.99 | Light Green |
| 1 to 1.99 | Yellow-Green |
| 2 to 3.99 | Yellow |
| 4 to 5.99 | Orange |
| 6 to 7.99 | Red-Orange |
| 8 to 10 | Red |

From this information, processor 34 creates another table wherein the tension levels are replaced with their corresponding colors. Table 3 below is based on the above data:

COLORS ASSIGNED TO TENSION RANGES OF TABLE 1

| | Sensor # | | | | | |
|---|---|---|---|---|---|---|
| | 0 | 1 | 2 | 3 | n − 1 | n |
| Width 1 | Yellow-Green | Light Blue | Blue | Orange | Yellow | Green |
| Width 2 | Yellow-Green | Light Blue | Blue | Red-Orange | Orange | Yellow-Green |
| Width 3 | Yellow-Green | Light Blue | Blue | Orange | Orange | Yellow-Green |
| Width 4 | Yellow-Green | Light Blue | Blue | Red-Orange | Yellow | Green |
| Width 5 | Yellow | Aqua | Light Blue | Red-Orange | Yellow | Green |
| ... | | | | | | |
| Width m − 1 | Yellow-Green | Light Blue | Blue | Red-Orange | Yellow | Green |
| Width m | Yellow | Aqua | Light Blue | Red-Orange | Yellow | Green |

Figure 5:
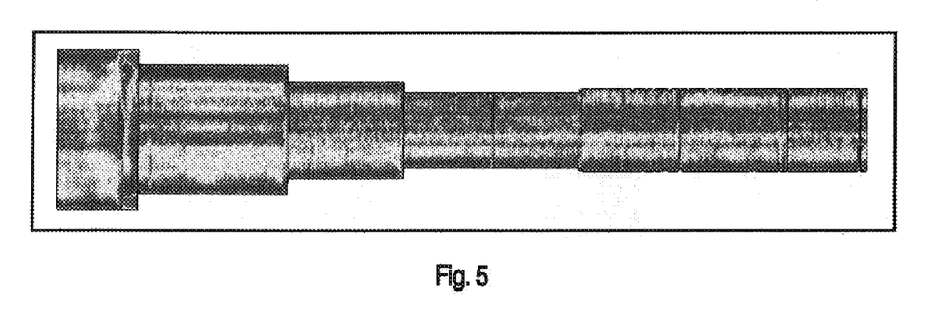
FIG. 5 is a detail view of region V of the display of FIG. 2.
Figure 6:
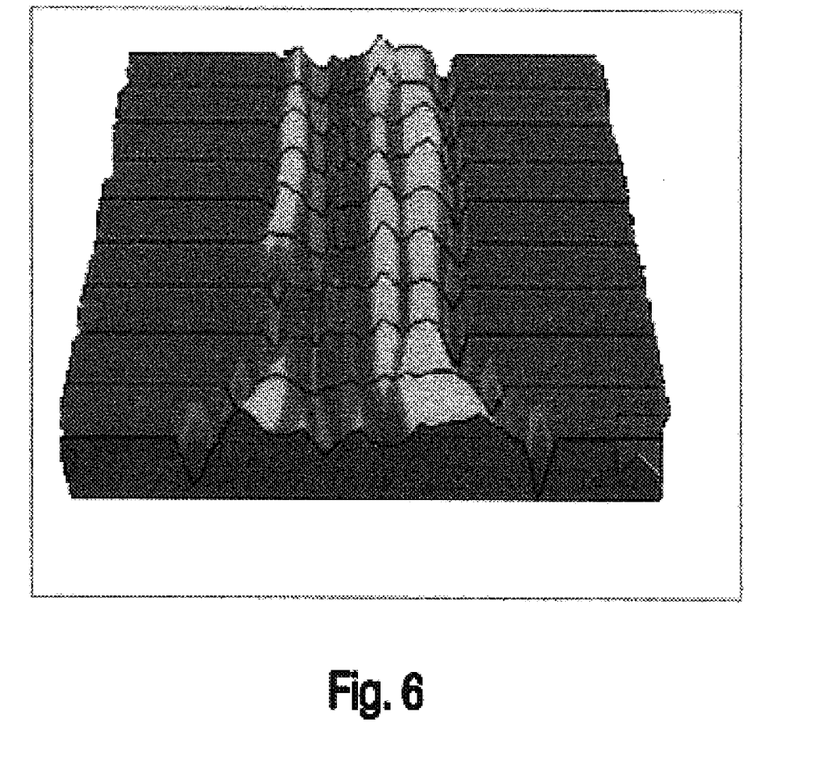
FIG. 6 is a detail view of region VI of the display of FIG. 2.

This data is used by a graphing program, such as Olectra Chart by ComponentOne, to create two separate graphical outputs shown in display 44 in FIG. 2 and in more detail in FIGS. 5 and 6. The different steps described above may also be divided between software modules in different manners. For example, the color assignments may be made by the charting software itself rather by another program running on central processor 34.

The first graphical output 10 is displayed in a first region 112 of display 44 and shown in detail in FIG. 5. First graphical output 110 comprises an image 114 of rolled steel sheet 20 plotted in color with different colors representing different tension levels sensed by sensors 22. Image 114 comprises a plurality of contiguous portions 116 corresponding to the short segments 102 of rolled steel sheet 20 measured each time drum 24 rotates. Each of these portions 116 is divided into a number of regions 118, each corresponding to an area on rolled steel sheet 22 at which a given sensor has taken a measurement. Thus, even though each measurement taken by each of sensors 22 will be a different distance from an end of the rolled steel sheet, all will be within one short segment 102, and tension along the entire length of the short segment 114 will be treated as constant. The length of short segments 114 can be decreased, for example, by using a drum having a smaller circumference. Based on the above data, the colors of the regions 118 in the first portion 116 of the image 114, from the bottom to the top of the display, will be yellow-green, light blue, blue and orange. As data is added to Table 1, additional plots are made so that image 114 of strip 20 lengthens as more and more of the strip passes over tension measuring device 16.

The process can also be understood by treating rolled steel sheet 20 as a first sheet, $rs_1$, of a plurality of similar steel sheets $rs_1 \ldots rs_n$, each of which is divided in a lengthwise direction into a plurality of width segments $w_1 \ldots w_m$. Each of sensors 22 on sensing device 26 is labeled, in the direction from left to right as seen in FIG. 2, $d_1 \ldots d_n$. In the preferred embodiment, n=54, but n could be larger or smaller depending on the type of sensing device used. On a single revolution of drum 24 of sensing device 26, each of the sensors $d_1 \ldots d_n$ measures tension at a point $x_1 \ldots x_n$ across a single width segment, with sensors $1 \ldots n$ corresponding to points $1 \ldots n$ along the width segment. Each time drum 24 rotates, n measurements are taken at a group of points $x_1 \ldots x_n$ on another one of the width segments $w_1 \ldots w_m$. Each time the drum rotates, the n sensors generate n output signals having values $s_1 \ldots s_n$ related to the tension sensed at each point $x_1 \ldots x_n$ on the width segment being sensed. For each width segment, these values are stored in a row $r_1 \ldots r_m$ of a table $t_1$ so that all the values for a particular width segment are stored in a single row. Each column of the table therefore comprises signals from one of the sensors $d_1 \ldots d_n$. A color is associated with each of the output signals $s_1 \ldots s_n$ based on the level of tension represented by the output signal. Finally, for each width segment $w_1 \ldots w_n$, points $p_1 \ldots p_n$ are plotted on display 44 which points correspond to points $x_1 \ldots x_n$ on the width of the steel $rs_1$. The color of each point $p_1 \ldots p_n$ is based on the level of tension represented by the output signals $s_1 \ldots s_n$ at the corresponding point $x_1 \ldots x_n$.

This display provides an operator with the ability to visualize the flatness of the rolled steel sheet 20 in real time and to detect patterns indicative of a problem with the rolling mill 10 or the steel itself much more readily than could be done by reviewing raw numerical data from the sensors 22. In addition, first graphical output 110 comprises additional images 120, 122, 124, 126, 128 and 130 of previously rolled steel sheets (not shown) so that tension variations from one sheet to the next can be compared. The images 120, 122, 124, 126, 128 and 130 are aligned along their respective centerlines so that portions of each sheet that were rolled by the same portions of rollers 12 are aligned and can be compared. This allows defects in the surface of rollers 12 to be quickly detected by observing the similar tension levels they impart to aligned areas of successive rolled steel sheets 20.

The data in Table 1 is also used to produce a second graphic output 132, namely a waterfall chart, shown in a second region 133 of display 44. This second region 132 is shown in greater detain in FIG. 6. To produce this second graphical output 132, tension values in each of the fifty-four columns for a given rolled steel sheet are summed and divided by the number of rows in the column. This provides an average value for the tension level sensed by a given sensor over the length of sheet 20.

The width of the strip is shown along the x axis of the graph, and the magnitude of the average tension value for each longitudinal band 104, 106 of the rolled steel sheet is plotted on the Y-axis, this plurality of points forming a first slice 134 of the waterfall plot. Nine additional slices 135–143 are also shown in FIG. 6; the front-most slice displayed represents data from the most recently rolled sheet.

The points are plotted in color based on the color correspondence of Table 2. Thus the average of the numbers shown in column 0 of Table 1 above is 1.5 which corresponds to the color yellow-green. The leftmost point on first slice 134 is thus plotted in yellow-green. Each point on first slice 134 thus has a color, even though it may be difficult to distinguish the colors of the fifty-four points along this line. However, the color data becomes more useful when a second slice 136 and subsequent slices are plotted adjacent first slice 134 in the same manner because corresponding points on each slice are connected by lines that indicate the change between the point on one line and the point on the other. Thus, for example, if a first point on the first slice 134 is yellow-green while the first point on the second slice 136 is yellow, a line will be plotted that shades gradually from yellow-green to yellow to show the transition.

First graphic output 110 and second graphic output 132 together provide an operator with a detailed real-time data concerning the tension in a given sheet and allow corrective action to be taken when tension levels indicative of a problem are noted. Line 146, for example in FIG. 5 shows a low tension area in a rolled steel sheet that varies little from sheet to sheet. Observations at a greater level of detail may reveal that this line 146 is actually a series of periodic points. This might suggest that a surface defect on one of the rollers 12 is periodically decreasing tension in the sheets as they are rolled. Likewise, the somewhat random distribution of colors at location 148 shows what appear to be normal operating conditions, and/or variations that are due more to the structure of the rolled steel sheet 20 than to the effects of the rollers 12. Likewise, stripe 150 in FIG. 5 shows an area of generally consistently high tension. This real time view also allows the effects of changes to be seen in close to real time. For example, if, in order to lower the tension represented by line 146 in FIG. 5 a certain adjustment is made to rolling mill 10, the effects of this adjustment on the next sheet will be readily observable from the corresponding illustration on display 44.

Figure 4:
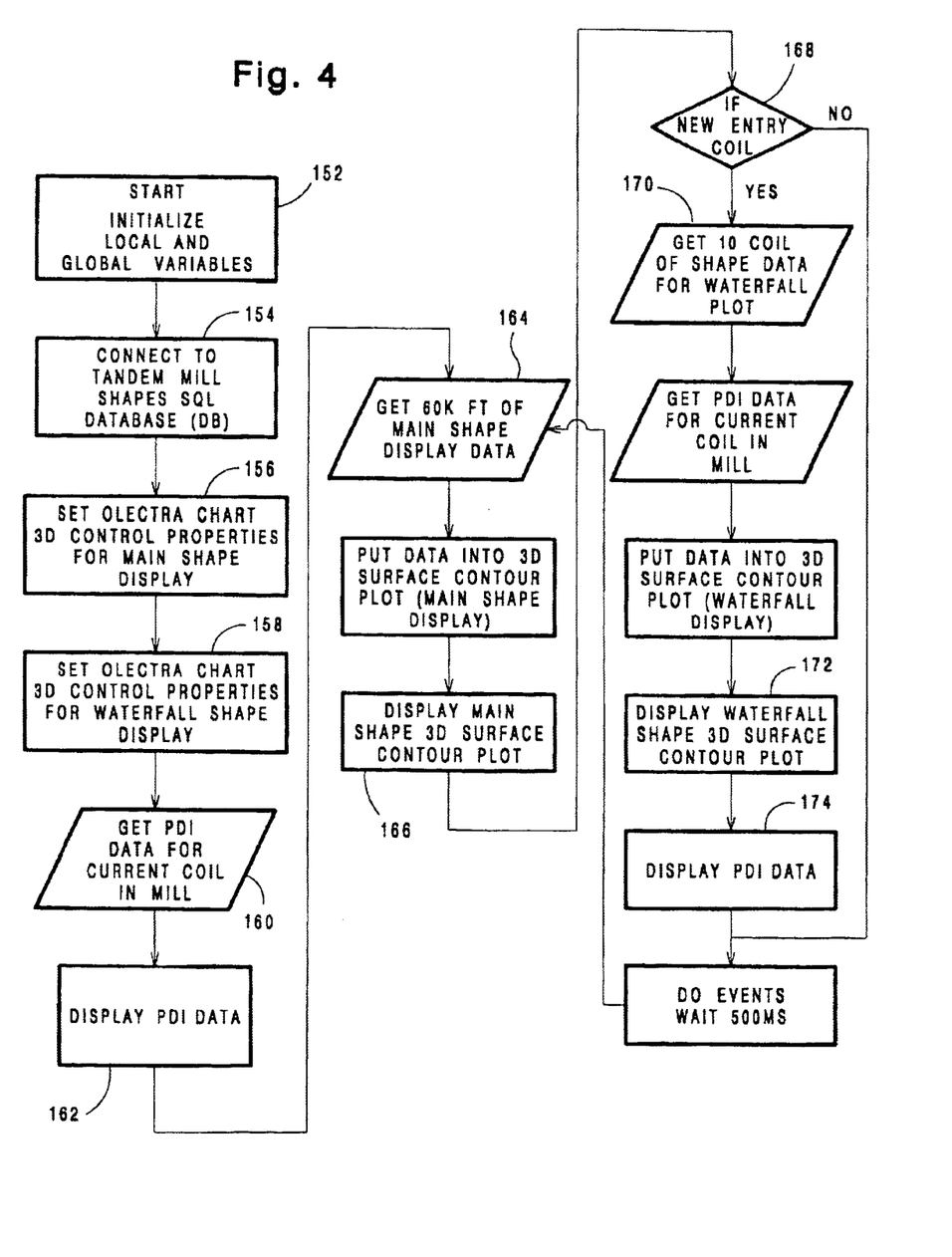
FIG. 4 is a flow chart showing how data from a database is used to generate images on a display.

FIG. 4 illustrates the steps followed in retrieving data from database 40. At step 152, local and global variables are initialized. At step 154 shape display software 42, which is preferably Olectra Chart shape display software, connects to database 40. At steps 156 and 158, the shape display software is configured to create first graphic output 110 and second graphic output 132. At step 160, PDI data for the sheet 20 being processed in mill 10 is obtained from secondary database 48 and displayed on display 44 in step 162. At step 164, data representing 60,000 feet of rolled steel sheet is obtained from database 40 and plotted in first region 112 at step 166. At step 168, a check is made to determine whether a new sheet has entered the mill, by checking the output of optical sensor 52, for example. If a new sheet is not detected, data representing the current 60,000 feet of sheet is updated at step 164. This process continues, with new colored regions corresponding to short segments 102 of sheet 20 being plotted in first region 112. Only data concerning the current 60,000 feet of sheet is maintained; older data is removed from the tables of database 40 to prevent the size of the database 40 from slowing down the operation of the system. If a new sheet is detected, average tension values for each band on each of the previous ten sheets are obtained from database 40 at step 170 and used to form the waterfall plot in second region 133 at step 172. PDI data for the new sheet is also obtained from secondary database 48 and displayed on display 44 at step 174. The system then returns to step 164 and updates the display in first region 112.

It has been found that this use of color allows operators to quickly spot trends and identify problems. While the numerical data generated by such as system could conceivably be processed to locate numbers suggestive of a problem, an experienced operator can often spot patterns more quickly and more reliably than a machine relying upon statistical analyses. Moreover the information generated can be stored and later associated with the particular rolled steel sheet. If a particular rolled steel sheet is not sufficiently flat to satisfy the requirements of a certain customer, for example, the saved date concerning its flatness may allow persons to determine another use for which the rolled steel sheet is suitable and/or to find portions of the rolled steel sheet that are acceptable for other uses. For example, if a problem is corrected after 10 percent of the rolled steel sheet has been rolled, the 90 percent of the rolled steel sheet that is defect free may be usable for other purposes. By associating PDI data with each sheet, an operator can also quickly determine whether the sheet is being produced to specification, as the degree of flatness variation that will be acceptable in a given sheet will vary.

The present invention has been described in terms of a preferred embodiment, it being understood that obvious modifications and additions to this preferred embodiment will become apparent to those skilled in the relevant art upon a review of this disclosure. It is intended that all such obvious modifications and additions be covered by the present invention to the extent that they are included within the scope of the several claims appended hereto.

What is claimed is:

1. A graphical flatness display for a rolled steel sheet, comprising:

at least one sensor for measuring a property of a rolled steel sheet at a plurality of locations on the rolled steel sheet and producing a property output signal corresponding to a magnitude of the sensed property at each of the plurality of locations;

a processor operatively connected to the at least one sensor for receiving said sensor property output signals, a memory operatively connected to said processor storing property magnitude ranges and a color corresponding to each of said property magnitude ranges; and a color display operatively connected to said processor;

wherein said processor receives a property output signal, determines the property magnitude range indicated by said received property output signal, and plots a point in the color corresponding to the determined property magnitude range on the display at a point on the display related to the location on the rolled steel sheet at which the property was sensed, and said processor produces an output for creating a graphical image representing the flatness of multiple rolled steel sheets.

2. The display of claim 1 wherein said processor produces an output for creating a first and a second graphical image, at least one of said images representing the flatness of multiple rolled steel sheets on the display.

3. The display of claim 2 wherein said first and second graphical images are different and both of said first and second graphic images represent the flatness of multiple rolled steel sheets.

4. The display of claim 3 wherein said first and second graphical images are based on measurements taken by said at least one sensor.

5. A Graphical flatness display for a rolled steel sheet, comprising:
   at least one sensor for measuring a property of a rolled steel sheet at a plurality of locations on the rolled steel sheet and producing a property output signal corresponding to a magnitude of the sensed property at each of the plurality of locations;
   a processor operatively connected to the at least one sensor for receiving said sensor property output signals,
   a memory operatively connected to said processor storing property magnitude ranges and a color corresponding to each of said property magnitude ranges; and
   a color display operatively connected to said processor;
   wherein said processor receives a property output signal, determines the property magnitude range indicated by said received property output signal, and plots a point in the color corresponding to the determined property magnitude range on the display at a point on the display related to the location on the rolled steel sheet at which the property was sensed, and said processor produces an output for creating a first and a second graphical image representing the flatness of the rolled steel sheet on the display, wherein said first graphical image comprises a color illustration of a flat surface of the sheet of rolled steel and the second graphical image comprises a waterfall plot of the average tensions values.

6. The display of claim 5 wherein said illustration includes representations of short segments of said rolled steel sheet.

7. The display of claim 6 wherein each representation includes a plurality of regions corresponding to data from one of said sensors.

8. A method of indicating the flatness of a first rolled steel sheet, comprising the steps of:
   measuring tension at a plurality of points across a first segment of a first rolled steel sheet;
   generating an output signal related to the tension sensed at each of the first segment plurality of points;
   measuring tension at a plurality of points across a subsequent segment of the first rolled steel sheet;
   generating an output signal related to the tension sensed at each of the subsequent segment plurality of points;
   displaying a representation of the first and subsequent segments of the first rolled steel sheet, the representation including regions corresponding to the plurality of points from each of the first and subsequent segments; and
   displaying a color at each region related to the tension measured at the corresponding one of the plurality of points from each of the first and subsequent segments;
   repeating said measuring, generating and displaying steps until an end of the first sheet of steel is detected;
   measuring the tension at a plurality of points across a first segment of a second rolled steel sheet;
   generating an output signal related to the tension sensed at each of the plurality of points on the second rolled steel sheet; and
   displaying a representation of a first portion of the second rolled steel sheet adjacent a representation of a subsequent portion of the first rolled steel sheet, the representation of a first portion of a second rolled steel sheet including a region corresponding to each of the plurality of points on the second rolled steel sheet; and
   displaying a color at each region related to the tension measured at the corresponding one of the plurality of points on the second rolled steel sheet.

9. The method of claim 8, including the additional step of displaying a second graphical representation of the flatness of the sheet.

10. A device for depicting the flatness of a rolled steel sheet in real time, comprising:
    a processor operatively connected to a sensing device measuring tension at a number of points on a rolled steel sheet and producing tension output signals related to sensed tensions;
    a database for storing numerical data related to said output signals;
    a memory storing colors corresponding to ranges of said numerical data;
    wherein said processor produces a display signal based on data in said database to create a real time color image of the rolled steel sheets on a display with regions on the display corresponding to points on the rolled steel sheets, wherein the colors of the regions on the display are related to the tension level sensed at the corresponding points on the rolled steel sheet, wherein said database includes a first table containing numeric data related to sensed tension levels and a second table containing averaged tension values from longitudinally spaced points along the sheet.

11. The device of claim 10, wherein said processor produces a second output signal to produce an image on a display based on data from said second table.

12. A device for monitoring the performance of a steel rolling mill, comprising:
    a plurality of sensors positioned to sense a tension at selected points along the width of a sheet of rolled steel being processed in a rolling mill, each of said sensors producing an output signal proportional to the sensed tension;
    a processor operatively connected to said tension sensors for receiving the sensor output signals,
    a memory operatively connected to said processor storing tension ranges and a color corresponding to each of the tension ranges; and
    a color display operatively connected to said processor;
    wherein said processor produces a representation of the surface of each sheet of rolled steel emerging from the rolling mill on the display comprising a plurality of regions corresponding to the selected points on the surface of said each sheet of rolled steel, the color of each region corresponding to the tension range into which the sensed tension at the corresponding selected point falls, and wherein the representations of the surface of each sheet of rolled steel emerging from the rolling mill includes a centerline, and the wherein the centerlines of adjacent sheets of rolled steel are aligned.

13. A device for displaying tension levels in a rolled steel sheet, comprising:

a processor operatively connected to a plurality of tension sensors for measuring tension at a plurality of locations spaced across the width of a rolled steel sheet and producing an output signal corresponding to the sensed tension;

a memory operatively connected to said processor storing tension ranges and a color corresponding to each of the tension ranges; and a color display operatively connected to said processor;

wherein said processor produces processor output signals for generating a color image on a color display comprising regions corresponding to the plurality of locations representing the tension of multiple rolled steel sheets, the color of each of said regions corresponding to the range into which the sensed tension falls.

14. A method of measuring the flatness of a sheet of rolled steel, comprising the steps of:

measuring the tension at a plurality of measurement points on the surface of a sheet of rolled steel;

determining a plurality of tension ranges into which the sensed tension level can fall;

associating a color with each of the determined tension ranges; and displaying a representation of the tension of multiple rolled steel sheets comprising a plurality of regions corresponding to the plurality of measurement points wherein the color of each region is the color associated with the tension range into which the measured tension for each measurement point corresponding to each display point falls.

15. A real time flatness display, comprising:

a processor connectable to a sensing device for measuring flatness at a number of points on a rolled steel sheet and producing an output signal corresponding to sensed flatness; and a memory operatively connected to the processor storing color information for each sensed flatness;

wherein the output signal produces on a display a two-dimensional image representing the flatness of multiple rolled steel sheets comprising a plurality of regions each corresponding to one of the plurality of points on each sheet of rolled steel, the color of each region being related to the sensed flatness at the corresponding point on the rolled steel sheet.

16. A display comprising first and second display fields, comprising:

said first display field displaying a first colored representation of a planar surface of at least first and second rolled sheets of steel wherein different colors on said colored representation represent different tension levels in said at least first and second rolled sheets of steel; and said second display field comprises a second colored representation of average tension levels along a first band of the first rolled steel sheet, a third colored representation of average tension levels along a first band of the second rolled steel sheet, and colored lines connecting corresponding points on said second colored representation and said third colored representation.

17. The display of claim 16 wherein said portion of the rolled steel sheet comprises a band extending from a first end of the rolled steel sheet to a second end of the rolled steel sheet.

18. The display of claim 16 wherein the representation of the average tension along a first portion of a first rolled sheet of steel and a representation of the average tension along a corresponding first portion of a second rolled sheet of steel are connected by graphics showing the difference between the average tension along the first portion of the first sheet of rolled steel and the average tension along the first portion of the second sheet of rolled steel.

19. A method of indicating the flatness of a first rolled sheet of steel $rs_1$ comprising the steps of:

a. providing a first rolled sheet of steel $rs_1$ having a plurality of width segments $w_1 \ldots W_m$ along a length of the first sheet of rolled steel $rs_1$;

b. providing a sensing device having a plurality of sensors $d_1 \ldots d_n$;

c. measuring a tension at a number of points $x_1 \ldots x_n$ across each width segment $w_1 \ldots w_m$ of the first sheet of steel $rs_1$;

d. generating output signals having a value $s_1 \ldots s_n$ related to the tension sensed at each point $x_1 \ldots x_n$ for each width segment $w_1 \ldots W_m$;

e. for each width segment $w_1 \ldots W_m$ storing the values $s_1 \ldots s_n$ in a row $r_1 \ldots r_m$ of a table $t_1$ wherein each column of the table comprises signals from one of said sensors $d_1 \ldots d_n$;

f. associating a color with each of said output signals $s_1 \ldots s_n$ based on the level of tension represented by said output signal;

g. for each width $w_1 \ldots w_n$ plotting points $p_1 \ldots p_n$ on a display corresponding to points $x_1 \ldots x_n$ on the width of the steel $rs_1$ wherein the color of each point $p_1 \ldots p_n$ is based on the level of tension represented by the output signals $s_1 \ldots s_n$.

20. The method of claim 19 comprising the additional steps of h) averaging the values in each column $1 \ldots m$ of the table to obtain an average column value; and i) plotting the average column values $acv_1 \ldots acv_m$ on the display.

21. The method of claim 20 including the additional steps of repeating steps a-g for additional rolled sheets of steel $rs_2 \ldots rs_z$.

22. The method of claim 21 including the additional steps of repeating steps h and i for the additional rolled sheets of steel $rs_2 \ldots rs_z$ and connecting plotted average column value $acv_1$ for rolled steel sheet $rs_1$ to plotted average column value $acv_1$ for second rolled steel sheet $rs_2$ in a manner that shows changes between the value of $acv_1$ for each rolled steel sheet.

* * * * *